United States Patent
Chambers et al.

(10) Patent No.: US 10,762,179 B2
(45) Date of Patent: Sep. 1, 2020

(54) SYSTEM AND METHOD FOR WATERMARKING SOFTWARE

(71) Applicant: IRDETO B.V., Hoofddorp (NL)

(72) Inventors: Catherine Chambers, Ottawa (CA); Philip Allan Eisen, Ottawa (CA); Robert Durand, Ottawa (CA); Grant Goodes, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 161 days.

(21) Appl. No.: 16/057,852

(22) Filed: Aug. 8, 2018

(65) Prior Publication Data

US 2020/0050740 A1    Feb. 13, 2020

(51) Int. Cl.
*G06F 21/16* (2013.01)
*G06F 21/14* (2013.01)

(52) U.S. Cl.
CPC ............ *G06F 21/16* (2013.01); *G06F 21/14* (2013.01)

(58) Field of Classification Search
None
See application file for complete search history.

(56) References Cited

U.S. PATENT DOCUMENTS

| | | | |
|---|---|---|---|
| 6,594,761 B1 | 7/2003 | Chow et al. | |
| 7,966,499 B2 | 6/2011 | Kandanchatha et al. | |
| 8,161,463 B2 | 4/2012 | Johnson et al. | |
| 8,510,571 B1* | 8/2013 | Chang | G06F 21/54 713/187 |
| 2009/0296922 A1* | 12/2009 | Smeets | G06F 21/16 380/28 |
| 2010/0251378 A1* | 9/2010 | Eker | G06F 21/14 726/26 |
| 2015/0200940 A1* | 7/2015 | Pace | G06F 21/16 726/3 |
| 2017/0300670 A1 | 10/2017 | Horne et al. | |

FOREIGN PATENT DOCUMENTS

EP    1675031 A1    6/2006

OTHER PUBLICATIONS

International Searching Authority, International Search Report and Written Opinion for International Application No. PCT/IB2019/056660 dated Oct. 29, 2019.
Monden et al., "A Practical Method for Watermarking Java Programs", The 24th Computer Software and Applications Conference (compsac2000), Taipei, Taiwan, Oct. 2000, 7 pages.

* cited by examiner

*Primary Examiner* — Brandon S Hoffman
(74) *Attorney, Agent, or Firm* — Rimon PC; Marc Kaufman (57) ABSTRACT

Systems, methods, and storage media implemented by a computer for enabling tracking of software are disclosed. Exemplary implementations may: receive marking input code corresponding to a computer program; identify locations of the marking input code that can be modified in ways that preserve functionality of the computer program; choose at least one code transformation with associated intrinsic constants; derive derived constants from the specific intrinsic constants; apply the at least one chosen code transformation, including injecting the derived constants into the marking input code; saving the results of the above steps on computer readable media as marked code; and save metadata including a list of the derived constants on computer readable media in a file that is separate from the marked code.

22 Claims, 8 Drawing Sheets

SYSTEM AND METHOD FOR WATERMARKING SOFTWARE

FIELD OF THE DISCLOSURE

The present disclosure relates to systems, methods, and storage media implemented by a computer for watermarking software.

BACKGROUND

Computer software is used to control a myriad of processes, in areas of business and entertainment for example. The market for computer software in all of its various forms is recognized to be very large and is growing every day. In industrialized nations, hardly a business exists that does not rely on computers and software either directly or indirectly, in their daily operations. The expansion of powerful communication networks, such as the Internet, has made it easy to exchange, copy and distribute software.

Software programs are typically written in a programming language and processed in some fashion, e.g., compiled to be turned into executable entities or interpreted. For example, software programs can be stored as text files containing source code in some high-level programming language, or text files containing assembly code, which require modification by a linker and loading by a loader in order to become executable. Thus, the term "software" as used herein, refers to executable code and or some executable or invokable behavior-providing entity which ultimately results from the conversion of code in some programming language into some executable or interpretable form or other data invoked by such code, such as static or shared libraries.

Digital watermarking is a process by which a marker is covertly embedded in digital content such as audio, video or image data. The marker is typically used to identify ownership, or to track distribution, of the digital content. Digital watermarks are typically only perceptible under certain conditions, i.e. after using a watermark detection algorithm. Watermarks are desired to be "robust" i.e., they cannot be easily removed by and attacker. Digital watermarking is useful in detecting unauthorized distribution, or other piracy, of digital content, such as video or audio content. For example, a watermark can be specific to a device and/or channel of distribution. When unauthorized content is discovered, the watermark can be read to ascertain the distribution device or distribution channel that is responsible for the unauthorized distribution.

The conceptual notion and benefits of watermarking for digital content could carry over to software. A marker could be similarly inserted into the software, and when unauthorized software is discovered, one can similarly learn about the distribution device or channel responsible. However, watermarking of executable software has tremendous challenges. While minor distortion of an image can be acceptable, any changes to software must not affect the function of the software. Known tracking of software is accomplished by recording hash-codes or signatures of code, or possibly by injecting identifiable strings or other junk data into the executable code. For example, A Practical Method for Watermarking Java Programs, The 24th Computer Software and Applications Conference (compsac2000), Taipei, Taiwan, October 2000, teaches that a copyright notice can be inserted into Java class files. Other techniques such as code-similarity detection and plagiarism-detectors are also known. However, current techniques for tracking software are not robust enough to serve as an effective watermark. For example, watermarks current techniques are easily removed, do not survive further processing, such as a compiling process, and/or can interfere with the function of the computer program code when executed.

SUMMARY

One aspect of the present disclosure relates to a system configured implemented by a computer for enabling tracking of software. The system may include one or more hardware processors configured by machine-readable instructions. The processor(s) may be configured to receive marking input code corresponding to a computer program. The processor(s) may be configured to identify locations of the marking input code that can be modified in ways that preserve functionality of the computer program. The processor(s) may be configured to apply at least one code transformation to marking input code. Each of the at least one code transformations may have a specific intrinsic constant. The processor(s) may be configured to derive derived constants from the specific intrinsic constants and inject the transformation, including the derived constants, into the marking input code. The processor(s) may be configured to derive derived constants from the specific intrinsic constants saving the results of the above steps on computer readable media as marked code. The processor(s) may be configured to save metadata including a list of the derived constants on computer readable media in a file that is separate from the marked code. Metadata can be used to determine if other computer program code was derived from the marked code.

Another aspect of the present disclosure relates to a method implemented by a computer for enabling tracking of software. The method may include receiving marking input code corresponding to a computer program. The method may include identifying locations of the marking input code that can be modified in ways that preserve functionality of the computer program. The method may include applying at least one code transformation to marking input code. Each of the at least one code transformations may have a specific intrinsic constant. The method may include deriving derived constants from the specific intrinsic constants and injecting the transformation, including the derived constants, into the marking input code. The method may include deriving derived constants from the specific intrinsic constants saving the results of the above steps on computer readable media as marked code. The method may include saving metadata including a list of the derived constants on computer readable media in a file that is separate from the marked code. Metadata can be used to determine if other computer program code was derived from the marked code.

Yet another aspect of the present disclosure relates to a non-transient computer-readable storage medium having instructions embodied thereon, the instructions being executable by one or more processors to perform a method implemented by a computer for enabling tracking of software. The method may include receiving marking input code corresponding to a computer program. The method may include identifying locations of the marking input code that can be modified in ways that preserve functionality of the computer program. The method may include applying at least one code transformation to marking input code. Each of the at least one code transformations may have a specific intrinsic constant. The method may include deriving derived constants from the specific intrinsic constants injecting the transformation, including the derived constants, into the marking input code. The method may include deriving derived constants from the specific intrinsic constants saving the results of the above steps on computer readable media as marked code. The method may include saving metadata including a list of the derived constants on computer readable media in a file that is separate from the marked code. Metadata can be used to determine if other computer program code was derived from the marked code.

Yet another aspect of the present disclosure relates to a system implemented by a computer for detecting a watermark in software, the system comprising: one or more hardware processors configured by machine-readable instructions to: receive marked code corresponding to at least a portion of a computer program, wherein the marked code is created by identifying locations of the marking input code that can be modified in ways that preserve functionality of the computer program, applying at least one code transformation to the marking input code, each of the at least one code transformations having a specific intrinsic constant, deriving derived constants from the specific intrinsic constants and injecting the transformation, including the derived constants, into the marking input code as watermark data. The marked code is scanned to look for specified patterns associated with the watermark data.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Software is often provided, or otherwise made available, to a party whose goals may be at variance with, or even outright inimical to, the goals of its provider. For example, a party may wish to eliminate program logic in the distributed software or hardware-software systems intended to prevent unauthorized use or use without payment, or may wish to prevent a billing function in the software from recording the full extent of use in order to reduce or eliminate the user's payments to the provider, or may wish to steal copyrighted information for illicit redistribution.

It is well known to prevent attacks to software by obfuscating or making the organization of the software code more confusing and hence, more difficult to modify. The term "obfuscate", as used herein, refers to adding elements to source code to make variables, data, or control flow of the executable code more difficult to understand without changing the function of the resulting executable code.

In a relatively simple example of obfuscation, variable names can be replaced with random character strings. For example, each occurrence of the variable name "SecurityCode" could be replaced with the character string "1xcd385mxc' So that it is more difficult for an attacker to identify the variables. Various mechanisms are known for protecting software by obscuring it or rendering tamper-resistant. For example, software can be rendered aggressively fragile under modification by increasing the interdependency of parts of the software. Also, software may deploy mechanisms which render normal debuggers non-functional. Further, software may deploy integrity verification mechanisms which check that the currently executing software is in the form intended by its providers by periodically checksumming the code, and emitting a tampering diagnostic when a checksum mismatch occurs, or replacing modified code by the original code (code healing). Further, a specific kind of data-flow network, called a cascade, can be interwoven throughout the code, in an attempt to greatly increase the density of interdependencies within the code. The protection can also take the form of many-to-many mapping of code sites to fragments of the software's functionality. Further, data addressing can be rendered interdependent, and variant over time, by means of geometric transformations in a multidimensional space, resulting in more obscure and fragile addressing code.

Examples of transcoding software for increased security are well known. For example, U.S. Pat. No. 8,161,463 entitled System and Method of Interlocking to Protect Software-Mediate Program and Device Behaviors, U.S. Pat. No. 7,966,499 entitled System and Method for Obscuring Bit-wise and Two's Complement Integer Computations in Software, and U.S. Pat. No. 6,594,761 entitled Tamper Resistant Software Encoding all teach systems and methods in which portions of software are transcoded in a manner that increases security of the software.

Each of these methods results in the injection of elements, such as a large number of relatively diverse constants, into the code when the program mathematics is subjected to a code transform. The result is that derived constants, basically mathematical combinations of the constants in the original applications mathematics along with the code transform intrinsic constants, are created. The disclosed implementations can leverage these derived constants for watermarking purposes. While the derived constants can result from an obfuscation process, the derived constants can also be the result of processes not intended for obfuscation.

The watermarks described herein are applied to code, referred to as "marking input code" herein. The marking input code can be in the form of source-code, or some derived binary representation, including but not limited to so-called Intermediate representations, all the way to binary-executable form. The marking input code is processed to identify locations where program code and data can be modified in ways that preserve functionality, and to perform those modifications. The modifications cause new constants to appear in the code. The new constants are entangled with the code and can form the basis for a watermark in the marked code. Candidate code can be scanned for detection of the watermarks. The watermarks described herein are difficult to remove from the marked code, because the constants cannot be changed or deleted without changing the functionality of the program. In other words, the watermark is "entangled" with the code.

Figure 1:
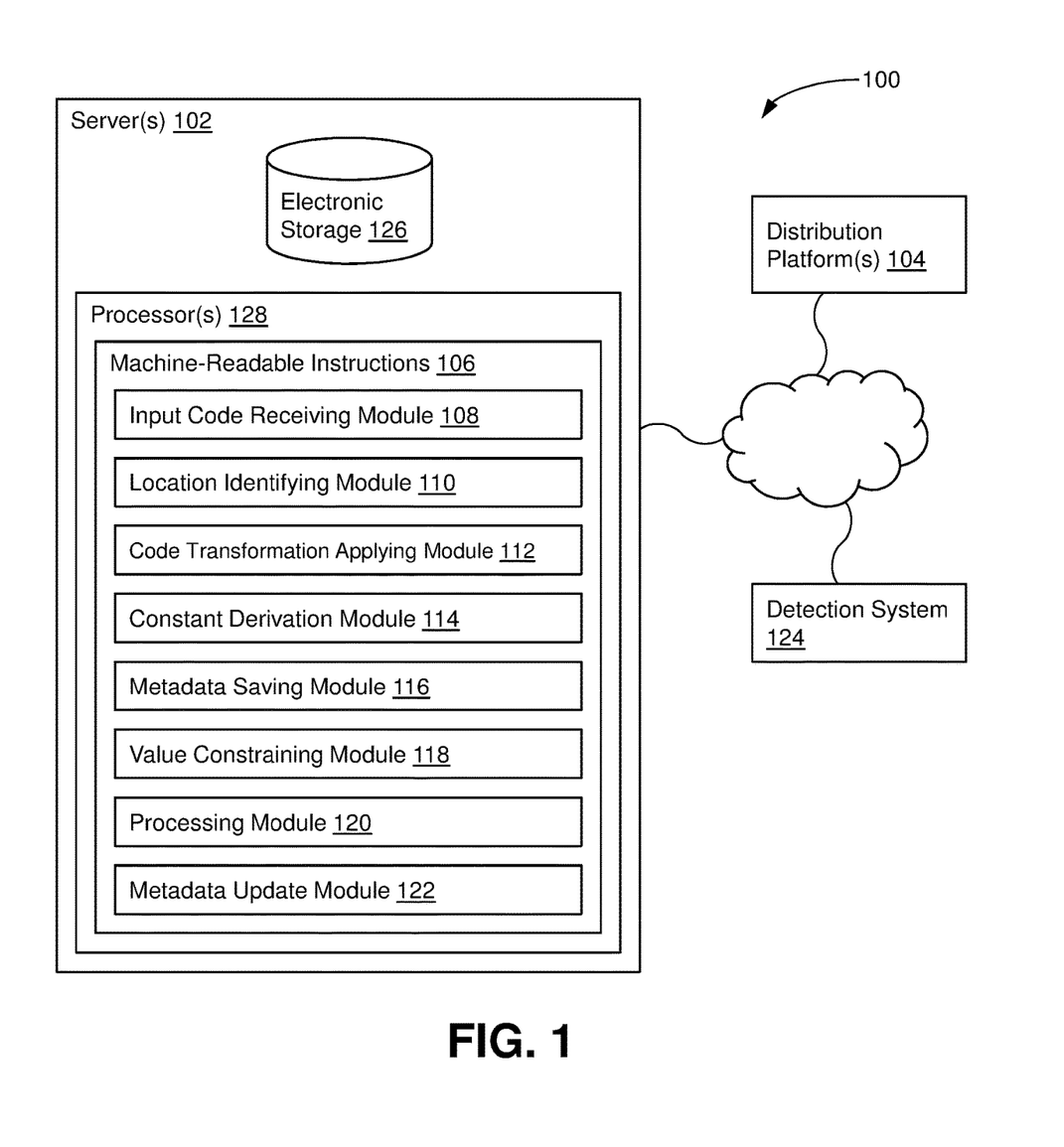
FIG. 1 is a schematic representation of a system implemented by a computer for enabling watermarking and tracking of software, in accordance with one or more implementations.

FIG. 1 illustrates a system 100 implemented by a computer for enabling tracking of software through a watermark, in accordance with one or more implementations. In some implementations, system 100 may include one or more servers 102. Server(s) 102 may be configured to communicate with one or more distribution platforms 104 over a network, such as the internet. Users may access system 100 via client computing platform(s) (not illustrated) or through other user interface devices.

Server(s) 102 may be configured by machine-readable instructions 106 executed by a computer processor(s) 128. Machine-readable instructions 106 may include one or more instruction modules. The instruction modules may include computer program modules. The instruction modules may include one or more of an input code receiving module 108, a location identifying module 110, a code transformation applying module 112, a constant derivation module 114, a metadata saving module 116, a value constraining module 118, a processing module 120, a metadata update module 122, and/or other instruction modules.

Input code receiving module 108 may be configured to receive marking input code corresponding to an executable computer program. For example, the marking input code can be, by way of non-limiting example, one of source code, LLV bit-code, binary code or interpretable code such as java script. Marking input code can be in executable form or can require further processing prior to execution. In some implementations, the further processing may include compiling, optimizing, linking and/or interpreting the marked code.

Location identifying module 110 may be configured to identify locations of the marking input code that can be modified in ways that preserve functionality of the computer program corresponding to the marking input code. Code transformation applying module 112 may be configured to apply at least one code transformation to marking input code. Each of the at least one code transformations may have a specific intrinsic constant. Constant derivation module 114 may be configured to derive derived constants from the specific intrinsic constants. Code transformation applying module 112 then injects the derived constants into the marking input code. Code transformation applying module 112 and constant derivation module 114 work in connection with one another. Constant derivation module determines the derived constants to inject, and code transformation module 112 injects the derived constants along with additional executable instructions. The derived constants are fundamentally tied to the transformation itself, making them very difficult to remove without breaking the transformation and thus changing the functionality of the code. The results of the above steps can be saved on computer readable media as marked code.

The derived constants may be mathematical combinations of constants in the marking input code and the intrinsic constants. The derived constants may be used as a watermark and the metadata can be used along with a detection algorithm to determine if other candidate computer program code was derived from at least a portion of the marked code. By way of non-limiting example, the steps of identifying, applying, deriving, and/or injecting may be part of an obfuscation process which renders the computer program more difficult to understand without adversely affecting the functionality of the code.

By way of non-limiting example, the detection algorithm may scan the other computer program code for a presence of a specified percentage of derived constants, scan within a portion of the candidate computer program code for constants in a corresponding portion of the marked code, scan the candidate computer program code for derived constants identified as coming from the same function across all similarly sized chunks, scan the candidate computer program code for derived constants within a certain distance from an already found derived constant, scan the candidate computer program code for derived constants having a certain property, and/or scan the candidate computer program code for near matches to derived constants. Applying a transformation may include transforming a control flow, including introducing switch statements with flow based on setting a dummy variable to different random values and the derived constants are the random values.

Applying a code transform may include transforming enumeration values and the derived constants are the alternate enumeration values. By way of non-limiting example, the detection algorithm may be applied to object code static libraries, shared libraries and/or an executable. The portion of the marked code can be a fractional portion of the marked code. The detecting algorithm can detect small portions of the watermark in the other computer program code. Note that, in FIG. 1, detection system 124 is shown as distinct from server(s) 102 and coupled to server(s) 102 by a network. However, Detection system 124 can be part of Server(s) 102. Also, detection system 124 need not be coupled to Server(s) 102 by a network. Detection system 124 is described in further detail below with respect to FIGS. 5-8.

In one implementation, the location identifying module 110 looks for mathematical computations in the received marking input code (e.g. addition, multiplication, XOR, comparisons) and the code transformation applying module 112 modifies the representation of both the associated data and the operations on that data, transforming the original representation to an alternate form. As an example, operation $z=x+y$ can be transformed using one or more of the of the following code transformation processes:

transform input data x into an alternate form $x'=a*x+b$, where a and b are randomly chosen constants over the finite ring 2n, where n is the size in bits of x.

transform input data y into $y'=c*y+d$.

transform output data z into $z'=e*z+f$.

transform the addition $z=x+y$ into $z'=gx'+hy'+j$, where g, h, and j are derived constants computed as:

$$g=e*a{-1}$$

$$h=e*c{-1}$$

$$j=f-e*a{-1}*b-e*c{-1}*d$$

The constants a through f may or may not appear in the code but the constants g, h and j will be added to, i.e. injected into, the code by the constant derivation module 114 to perform the operation in the transformed space. The direct result of these transforms will be the modification of the marking input code, and the injection of many diverse constants into the code to create the marked code. Moreover, these constants are largely unconstrained—in the example above, a, c, and e must be odd, while b, d, and f can be freely chosen. For an operation on 32-bit values, there are $2^{31}$ possibilities for g and h, and $2^{32}$ possibilities for j.

Implementations of the invention can modify other locations and produce large diverse constants in other ways as well. For example, control flow flattening techniques can be used as transforms to introduce switch statements with flow based on setting a dummy variable to different random values. The specific value choices can be embedded in the code as constants. Also, alternate/transformed Enumeration constants can be injected. As one example of this, "enum flag{on, off}" would normally give values on=0 and off=1, but that can be transformed to on=0x718234923 and off=0xa124.

Metadata saving module 116 may be configured to save marking metadata including a list of the derived constants on computer readable media in a file that is separate from the marked code. The metadata can be saved in electronic storage 126 and/or memory of detection system 124. Metadata can be used to determine if other computer program code was derived from the marked code as discussed with reference to FIG. 5-8 below. The metadata may further include, for each derived constant, the value of the derived constant and contextual information related to the derived constant. By way of non-limiting example, the contextual information may include information indicating whether the derived constant appears within a function or in global data, a compilation unit in which the derived constant appears, expected proximity of the derived constant to other derived constants, and/or possible alternate representations of the derived constant.

Value constraining module 118 may be configured to constrain the values of the derived constants. For example, a minimum constant rate (x constants per y bytes of code) could be imposed. As another example, additional constraints can be imposed on the constants as a way of storing additional information in the watermark. For example, a constraint condition could be that at least 50% of the constants be divisible by 3 (as opposed to 33% at random). Processing module 120 may be configured to further process the marked code to produce a binary executable. The further processing can be compiling, linking, or other processes as noted above.

Metadata update module 122 may be configured to update the metadata subsequent to storage thereof. The updating may include removal of at least one derived constant from the list of derived constants and/or adding contextual information relating to at least one derived constant. The updating can be configured to facilitate watermark detection as described below. Reasons update the metadata to remove a constant could include:

the constant cannot be found in this representation of the code (e.g. constant removed by optimization);
the constant shows up too often in this representation of the code; and/or
the constant does not meet identified constraining criteria (too small, not divisible by 3, etc.).

New or changed contextual information from later stages may include:

updated info about function location (e.g. the compiler may inline functions into other functions);
which section of the object file the constant appears in (code section, bss section, etc.);
new or modified information about proximity to other constants; and/or
which section of the linked executable the constant appears in.

Separate marking metadata files can be created at every stage, or the original marking metadata file can be updated. The former approach may be beneficial if there is a desire to perform watermark detection on different code representations (e.g. source code found on github). The latter is beneficial for reducing storage requirements. The marking metadata can be specifically named. For example, the metadata can be named as source code marking metadata, post-compile marking metadata, or binary executable marking metadata. The marked code can be classified as, marked object files, marked binary executable, etc. If there is a minimum constant rate as a constraint, it can be enforced at any stage, causing a rejection of the marked software and a restart of the watermarking process on the marking input code if the constraint is not met by the marked code.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Server(s) 102, distribution platform(s) 104, and/or detection system 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, distribution platform(s) 104, and/or detection System 124 may be operatively linked via some other communication media or not liked at all.

Detection system 124 may include one or more processors configured to execute computer program modules. By way of non-limiting example, the detection system 124 may include one or more servers or other computing devices.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute modules 108, 110, 112, 114, 116, 118, 120, and/or 122, and/or other modules. Processor(s) 128 may be configured to execute modules 108, 110, 112, 114, 116, 118, 120, and/or 122, and/or other modules by software; hardware; firmware; some combination of software, hardware, and/or firmware; and/or other mechanisms for configuring processing capabilities on processor(s) 128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, and/or 122 are illustrated in FIG. 1 as being implemented within a single processing unit, in implementations in which processor(s) 128 includes multiple processing units, one or more of modules 108, 110, 112, 114, 116, 118, 120, and/or 122 may be implemented remotely from the other modules. The description of the functionality provided by the different modules 108, 110, 112, 114, 116, 118, 120, and/or 122 described below is for illustrative purposes, and is not intended to be limiting, as any of modules 108, 110, 112, 114, 116, 118, 120, and/or 122 may provide more or less functionality than is described. For example, one or more of modules 108, 110, 112, 114, 116, 118, 120, and/or 122 may be eliminated, and some or all of its functionality may be provided by other ones of modules 108, 110, 112, 114, 116, 118, 120, and/or 122. As another example, processor(s) 128 may be configured to execute one or more additional modules that may perform some or all of the functionality attributed below to one of modules 108, 110, 112, 114, 116, 118, 120, and/or 122.

Figure 2:
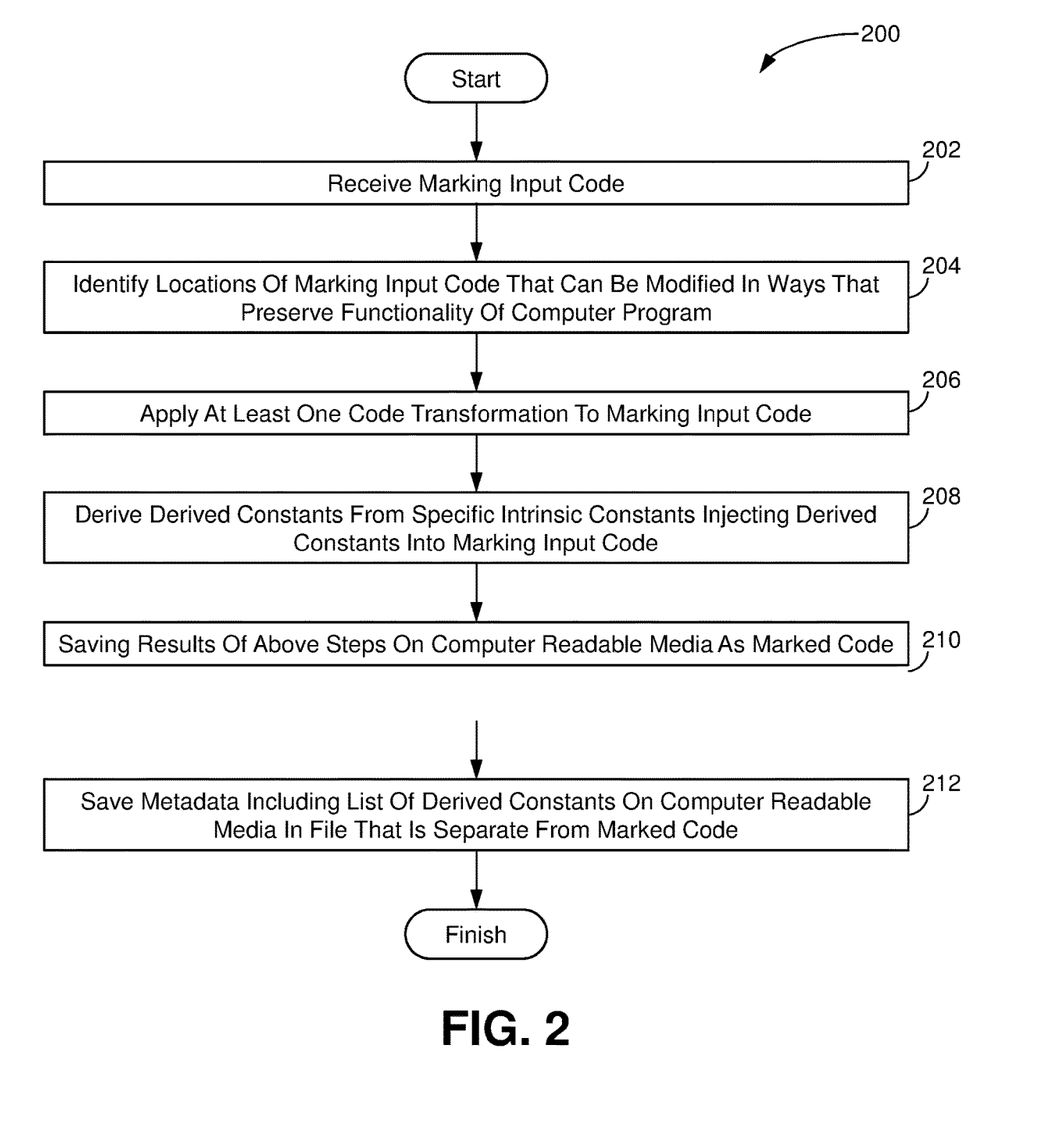
FIG. 2 is a flow chart of a method implemented by a computer for enabling watermarking of software, in accordance with one or more implementations.

FIG. 2 illustrates a method 200 for watermarking software in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving marking input code corresponding to a computer program. Operation 202 may be performed by one or more hardware processors configured by machine-readable instructions including a module that is the same as or similar to marking input code receiving module 108, in accordance with one or more implementations.

An operation 204 may include identifying locations of the marking input code that can be modified in ways that preserve functionality of the computer program. Operation 204 may be performed by one or more hardware processors configured by machine-readable instructions including a module that is the same as or similar to location identifying module 110, in accordance with one or more implementations.

An operation 206 may include applying at least one code transformation to marking input code. Each of the at least one code transformations may have a specific intrinsic constant. Operation 206 may be performed by one or more hardware processors configured by machine-readable instructions including a module that is the same as or similar to code transformation applying module 112, in accordance with one or more implementations.

An operation 208 may include deriving derived constants from the specific intrinsic constants, the derived constants are injected into the marking input code. Operation 208 may be performed by one or more hardware processors configured by machine-readable instructions including a module that is the same as or similar to constant derivation module 114, in accordance with one or more implementations.

An operation 210 may include saving the results of the above steps on computer readable media as marked code. Operation 210 may be performed by one or more hardware processors configured by machine-readable instructions including a module that is the same as or similar to constant derivation module 114, in accordance with one or more implementations.

An operation 212 may include saving metadata including a list of the derived constants on computer readable media in a file that is separate from the marked code. Metadata can be used to determine if other computer program code was derived from the marked code. Operation 212 may be performed by one or more hardware processors configured by machine-readable instructions including a module that is the same as or similar to metadata saving module 116, in accordance with one or more implementations.

Watermark detection can be accomplished by detection system 124 (FIG. 1) and can be accomplished on software in many forms such as source-code, derived binary representations, including but not limited to "Intermediate Representations", object code, static libraries, all the way to binary-executable form, including executables and shared libraries. The software which is scanned for detection of the watermark is referred to and "candidate software." The candidate software can be software that has been improperly used or distributed or is suspected of being derived from the marked software. There may be a single piece of candidate software or there may be many. Candidate software is evaluated using a detection algorithm and the output can be either "watermark found" or "no watermark found".

The basic format of a detection algorithm can be very simple—search the candidate software for constants. The search may happen byte-wise, word-wise, or in another manner; may be sequential or random; may look at all of the candidate software, or just one part; may be format aware, or format unaware.

Detection system 124 can be supplied with one or more pieces of the marking metadata described above, and will look for a specific watermark, or associated pattern, in the candidate software. The metadata may be of a specific form that is related to the particular form the candidate software (e.g. source code marking metadata when looking at a source code representation). Detection system 124 executes the detection algorithm and accesses the marking metadata as needed, alone or in combination with electronic storage 126.

Figure 3:
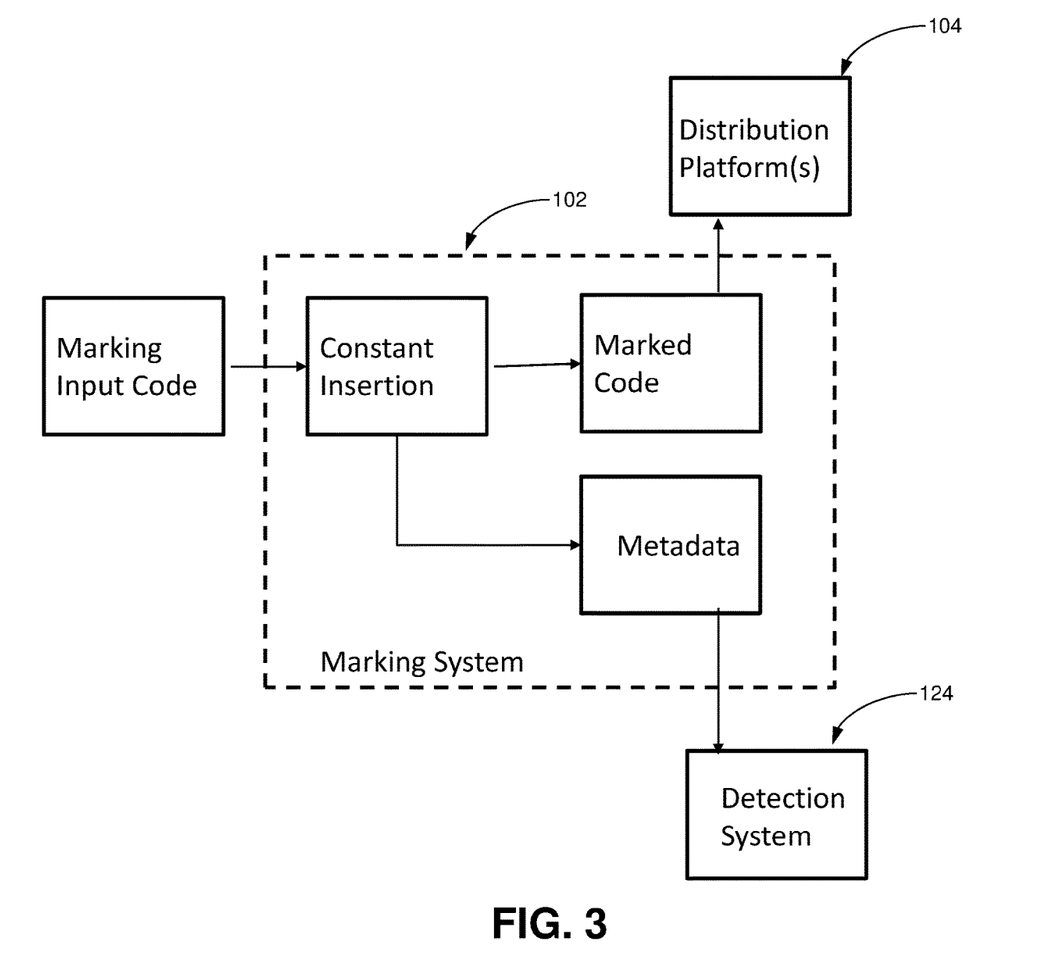
FIG. 3 is a schematic data flow diagram in accordance with one or more implementations.

FIG. 3 illustrates data flow of a disclosed implementation. Marking input code is provided as an input to the marking system, such as server(s) 102. Constant insertion results in marked code and metadata as described above. The marked code is provided, directly or indirectly, to distribution platforms 104. The metadata can be provided to detection system 124 to be used in the manner described below.

Figure 4:
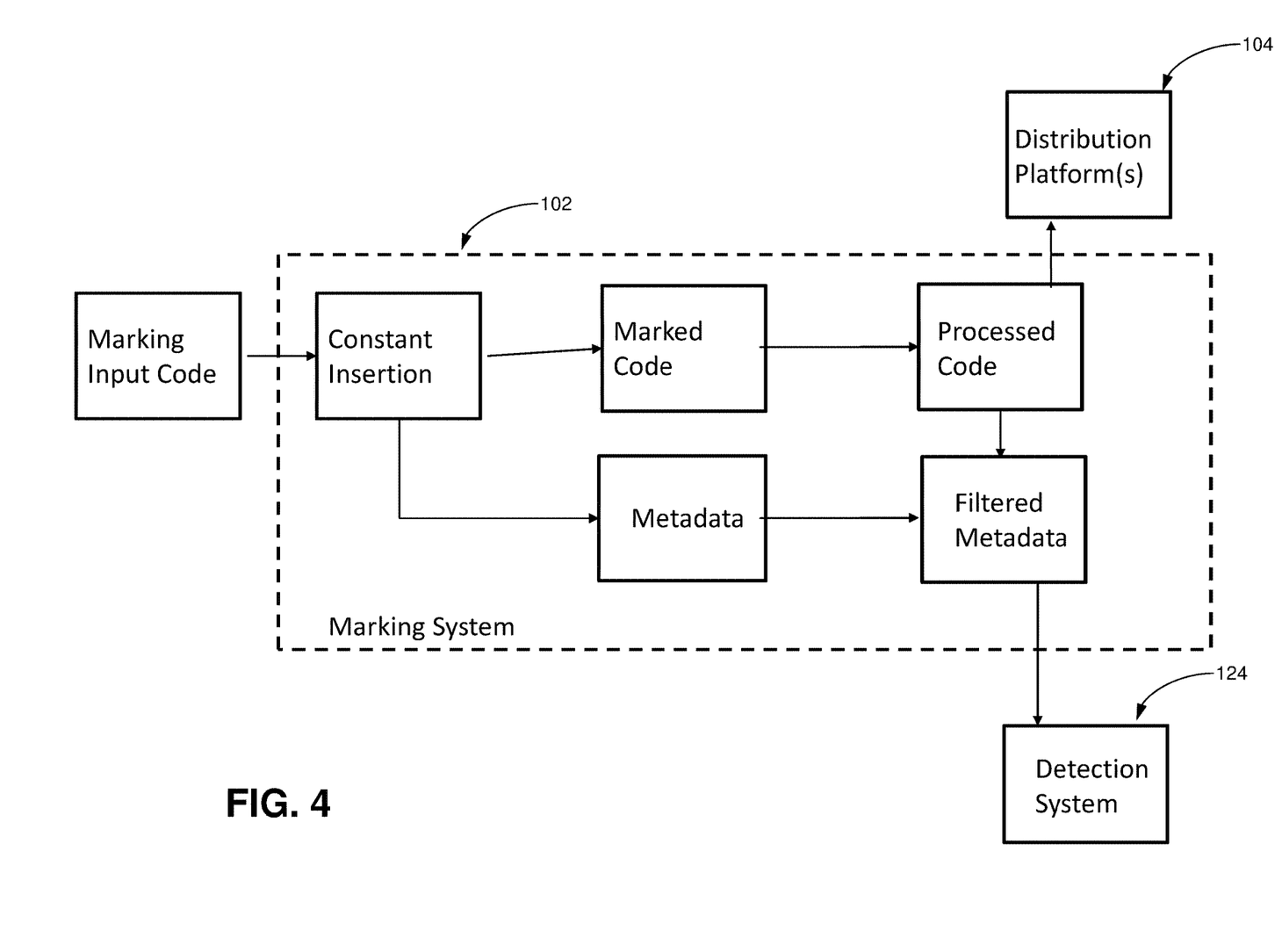
FIG. 4 is a schematic data flow diagram in accordance with one or more implementations.

FIG. 4 illustrates data flow of a disclosed implementation wherein the code is subject to further processing after marking. As disclosed above, the further processing can be compiling, linking or other processing that results in executable code. Marking input code is provided as an input to the marking system, such as server(s) 102. Constant insertion results in marked code and metadata as described above. The marked code is then subject to further processes, compiling and linking for example, to create an executable that is provided, directly or indirectly, to distribution platforms 104. The metadata is updated, in the manner described above for example, and the filtered metadata is provided to detection system 124 to be used in the manner described below. As noted above, filtering can include removal of constants or other manipulation of metadata based on the processing accomplished after marking.

Figure 5:
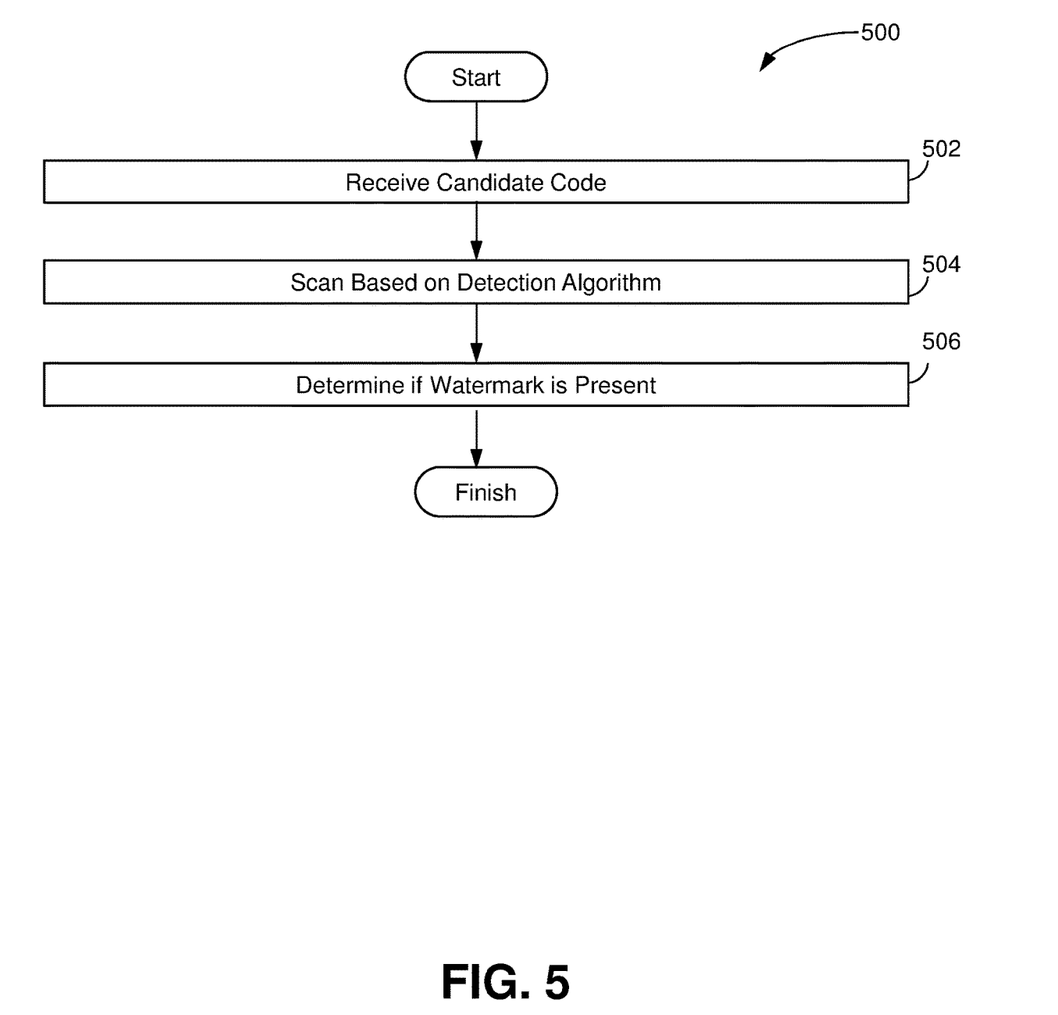
FIG. 5 is a flow chart of a method implemented by a computer of operation of a detection system, in accordance with one or more implementations.

FIG. 5 illustrates a method 500 of operation of detection system 124 at a high level. In step 502, candidate code is received, i.e. made available to detection system 124. Again, the candidate code can be an entire application or only a portion of an application and can assume various forms as noted above. In step 504, the candidate code is scanned in accordance with the detection algorithm. Examples of the detection algorithm are discussed in more detail below. In step 506, it is determined, based on the detection algorithm, whether the watermark is present. Of course, presence of the watermark is evidence that the candidate code is a copy of, or was derived from, the marked code.

A "blind" detection algorithm is an algorithm that scans the candidate software based on certain rules, without having direct access to the marking metadata to use for comparison. In other words, it is not comparing the candidate software to any other software, it is simply looking for a predetermined pattern. A non-blind detector is supplied with one or more pieces of marking metadata and will look for a specific watermark in the candidate software based on the metadata. Either detection mechanism can be used in connection with the invention. In non-blind detection, a specific form of metadata, that is related to the particular form the software takes (e.g. source code marking metadata when looking at a source code representation), may be used. Alternatively, generic metadata can be used. In non-blind detection, the output can be refined as "no watermark found" or "watermark xyz found", naming the specific mark or piece of marked software that is matched.

Figure 6:
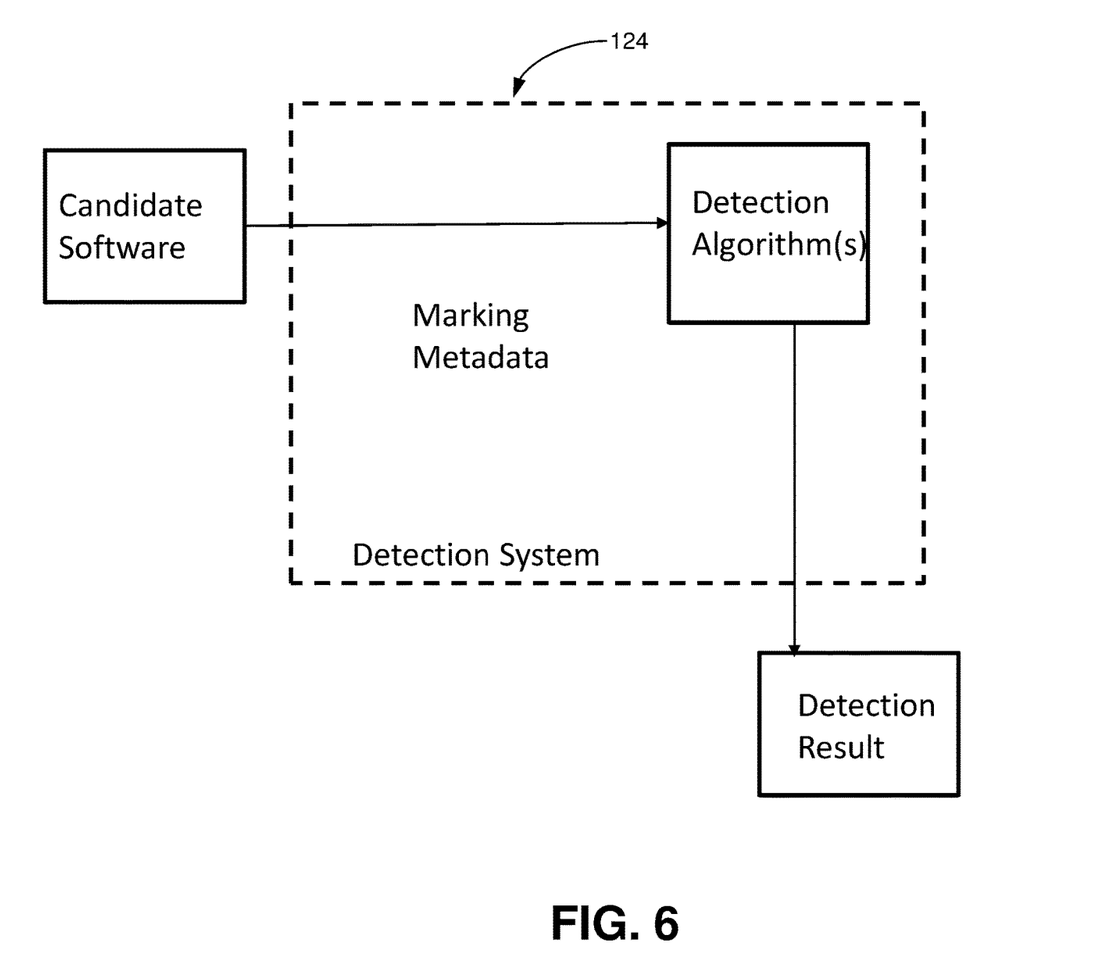
FIG. 6 is a schematic data flow diagram of a blind detection mechanism.

FIG. 6 illustrates the data flow of a blind detection algorithm. In FIG. 6, candidate software, as an input to detection system 124, is subject to scanning in accordance with one or more detection algorithms that look for specified patterns. The output is the detection result.

Figure 7:
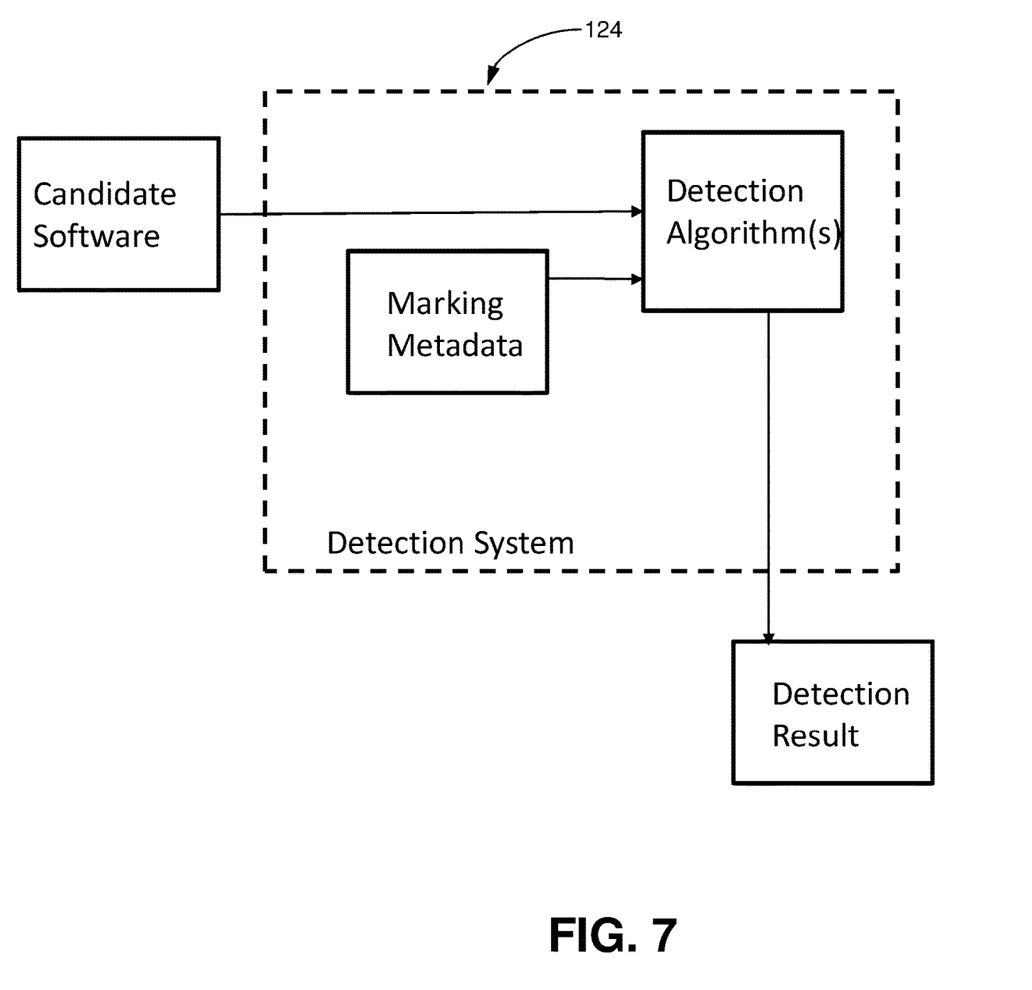
FIG. 7 is a schematic data flow diagram of a non-blind detection mechanism.

FIG. 7 illustrates the data flow of a non-blind detection algorithm. In FIG. 7, candidate software, as an input to detection system 124, is subject to scanning in accordance with one or more detection algorithms. The detection algorithms can access the marking metadata, described above, to look for specified constants and/or patterns indicated by the metadata. The output is the detection result. Note that, in FIG. 7, the metadata is shown as being stored within detection system 124. However, the metadata can be stored elsewhere and accessed by detection system 124.

Various detection algorithms can be used, and the algorithms can range from very simple to more complicated. Non-liming examples of detection algorithms include:
  scan for a presence of a percentage of constants from the marking metadata;
  scan within a portion of the candidate software for constants in a corresponding portion of the marked software;
  scan for constants identified as coming from the same function across all similarly sized chunks of the candidate software;
  scan for constants within a certain distance from an already found constant scan for constants having a certain property (e.g. divisible by 3); and
  scan for near matches to constants (e.g. constant±1, −constant), to detect basic means of tampering with the watermark.

In one implementation, detection system 124 includes a framework into which various detection algorithms can be inserted, e.g. programmed and or selectively executed. If simpler detection algorithms do not produce a definitive result, more advanced (and likely slower) algorithms are run to add certainty. The algorithms can be set to achieve desired false positive (watermark found incorrectly) and false negative (watermark missed) rates, and detection algorithms can be executed in combination until the desired rates are achieved. Some non-limiting examples of tuning detecting system 124 to achieve desired results are set forth below.

In one scenario, a software creator has encapsulated valuable intellectual property in one or more functions of a software program. It is assumed that this IP is worth protecting against reverse engineering, and that the code is written in such a way that it would be worthless for an attacker to lift only part of it (Essentially, this means that the attacker will not lift half a function; this is difficult to do anyway.) If the attacker will lift the code intact, the entire watermark related to that code will be found in a pirated program. In most situations these assumptions are not necessary, but they facilitate explanation of possible mathematical models.

The format of the stolen code (candidate code) within the pirate program will be roughly the same as the original. In particular, we can assume that if the code took up b bytes originally, it will take up no more than k*b bytes after lifting, where k is a parameter analyzed below. An upper bound on the size of a candidate program can be set at 100 GB to balance resources against detection accuracy.

As an example, the desired false positive rate can be set to $10^{-9}$, i.e. there is less than a 1 in a billion chance that a program is incorrectly determined to have been derived from the watermarked code. In practice, this number can be adjusted based on specifics of the application. The actual probability of a false positive is likely vastly lower, because once a candidate has been identified, it can be analyzed manually to look for other traits, most importantly its functionality.

Figure 8:
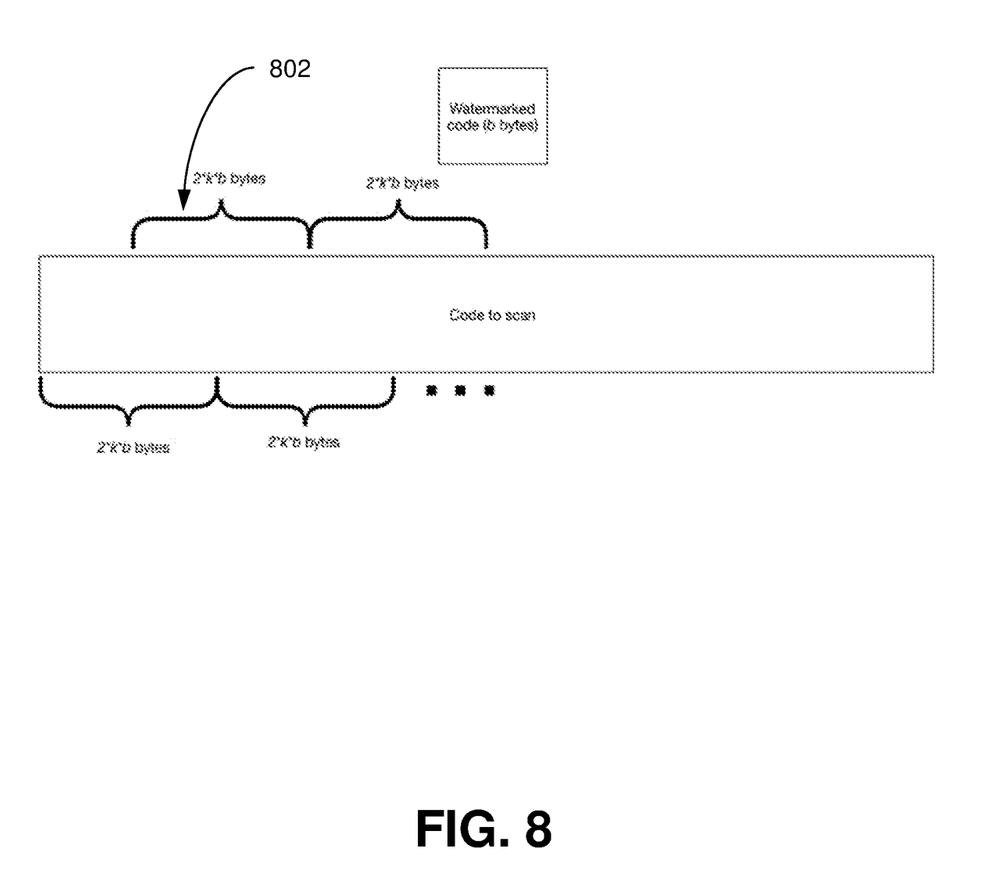
FIG. 8 is a schematic diagram of a code scan example.

With reference to FIG. 8, the number of constants in the watermarked code will be denoted as m. If the watermark is embedded in code of b bytes. Detection system 124 can scan a range of t=2*k*b bytes at a time (one such range is indicated at 802), with each chunk having 50% overlap with the previous. If the assumption about the watermark appearing in a k*b byte range holds, the detection algorithm is guaranteed to find the watermark. A reasonable value for k is 4.

The maximum number of chunks to be scanned, then, is 2*100,000,000,000/t (25,000,000,000/b if k=4). The actual number of chunks for a given program can be denoted as h. A false positive would occur if one of the chunks of t bytes had all m of the watermark constants within it. However, the likelihood of this occurring at random is very small. This can be modeled as follows: In t independent trials of an experiment with n possible outcomes, what is the likelihood that all of m specified outcomes occur? (Note that m<t, otherwise the likelihood is trivially 0.) Call this value P(m,n,t). For t being relatively small compared to n, this can be approximated as $(t/n)^m$, where $n=2^{32}$. Across all the chunks, then, the probability of a false positive is $1-(1-(t/2^{32})^m)^h$.

Experimentally, this can be approximated as $h*(t/2^{32})^m$. Recalling that h varies inversely with t, for m>1, the smaller t is, the less likely a false positive is. Since t is just a multiple of b, the size of the original code, we find that for a fixed size of watermark, there is essentially no lower bound on the size of code that can be watermarked, because the smaller the code, the more robust the watermark. With a candidate program of 100 GB, the result is that for small t (<1000), only 3 constants are needed to have a false positive rate of less than $10^{-9}$. This suggests that any code that has enough operations to generate 3 persistent constants during marking can be protected. Depending on the function, this could be as little as a single line of code.

Another consideration is the size of candidate code needed for watermark detection. With examples such as a proprietary codec, or a white-box crypto implementation, the full encapsulation of valuable IP can be thought to be not less than 1 KiB and probably no more than 100 KiB. Depending on the choice of k, this suggests a t value between 1 and 1000 KiB. With m=4 and t=1000000, the false positive rate is around $6*10^{-10}$. Now in this case, while a larger t requires a larger m, as a percentage overhead, m/t becomes smaller the larger t gets. Regardless, 4 constants in 1 KiB or more of code is a tiny overhead, far less than we would expect for cloaking of valuable IP in general. Viewed another way, if transcoding is used only for the purpose of watermarking, and not obfuscation or another process/purpose, marking can be accomplished with a very small performance penalty.

Piracy detection, i.e., detection of impermissible use and distribution of code is a common use of watermarking. While certain cites are known as illegitimate distributors, it can be difficult to recognize the relevant software of concern amongst the possibly millions of software applications on these sites. Further, the "pirate" may take steps to disguise the software. Aside from the obvious things such as changing file names and dates, removing copyright info and stripping code signatures, the pirate may try to change the sizes of files, and may even try to change some instructions that are deemed innocuous. A simple hash/signature comparison will often not work.

However, if the pirate pads the file with multiple GB of 0's or random data, this can be detected and stripped out. Therefore, it is pragmatic to assume that the code size of the pirate program is no more than k (k is defined above) times the code size of the original. As in the IP theft case, the pirate has a limited ability to move constants around without affecting program functionality. Therefore, if a group of watermark constants occur within b bytes in the original program, they occur within k*b bytes in the pirate program.

The code section of the complete application can be assumed to be at least 100 KiB in size. Again, with an upper bound of 100 GB on the size of a candidate program (and thus an upper bound of (100/k)GB on the size of the original marked code), a portion of the candidate program can be downloaded to distinguish the code section from other sections. The watermark can be distributed throughout the code. As discussed above, the overhead of watermarking is small. There may be certain functions that are transcoded more heavily, and thus produce a large number of constants, but we can assume there is some minimum number of constants in each portion of the code.

Assuming we can receive the entire candidate download, and the pirate does not alter the watermark, the false positive rate can be set to a desired maximum level. The false negative rate will be 0; any candidate program that meets the watermark threshold will be identified as a pirated program. For example, for a desired false positive rate of $10^{-9}$, with no damage to the watermark, we can determine a minimum of how much of the candidate program must be analyzed. For an entire candidate program and a desired false positive rate of $10^{-9}$, we can determine how much of the watermark must be intact. In other words, the difficulty for a pirate to disguise the software and avoid detection can be adjusted based on situational characteristics such as the value of the code, bandwidth, and the like.

As an example, a conservative minimum watermark rate of 1 constant per 1000 bytes of code can be set. There is no direct translation between constants/KiB and performance overhead, but it's safe to assume that at this rate, the overhead should be small for most programs. Based on these assumptions, there are at least 100 watermark constants in marked software.

If a candidate program has been downloaded (or otherwise received/accessed), the candidate program can be scanned a chunk at a time. For convenience, chunks of k*100 KiB can be used, and mapped to the corresponding 100 KiB of the marked program. Therefore, at least 100 specific watermark constants are identified. If the candidate program is a pirated program, i.e. derived from the marked code, all of these constants would be expected to appear. However, the likelihood all these constants appear in a non-pirated program is very low. For all reasonable values of k (e.g. <1000), this number is much less than $10^{-100}$. Moreover, this number multiplies with each chunk. For example, if 10 chunks are scanned, the number is less than $10^{-1000}$ for 100 chunks, it's $10^{-10000}$ etc. Based on the selected minimum program size, the false positive rate is at most $10^{-100}$.

Further, for every k KiB of a candidate program, there will be at least 1 watermark constant if the candidate is a pirated program. The likelihood of seeing the identified constant in a non-pirated program varies with k. Again, looking at the extreme example case of k=1000, this likelihood is $\sim 3*10^{-4}$. Thus, to get a false positive rate of $10^{-9}$ or less, we can download 3 chunks of k KiB (($3*10^{-4})^3 \sim 3*10^{-11}$). This suggests that it may not be necessary to download the entire candidate in order to determine if it is a pirated program.

Suppose a candidate program is scanned and d watermark constants are found per k*100 KiB. d may be less than the expected value because the pirate has actively taken steps to alter the software to destroy the watermark constants. As above, this is quite difficult to do, but the question can still be asked: how much of the watermark must persist in order to still be detected. The answer depends on the desired false positive rate, such as less than $10^{-9}$, for example. For a given rate, we can compute the minimum value of d that achieves this rate. For example, with k=1000, at d=6, the false positive rate is $1.5*10^{-10}$. So only 6% of the watermark must be intact to distinguish non-pirated programs from pirated programs at a false positive rate better than $10^{-9}$.

P(m,n,t) referenced above can be defined as follows: In t independent trials of an experiment with n possible outcomes, what is the likelihood that all of m specified outcomes occur? For clarity, we can assume that the m outcomes must all be distinct. To give a specific example, if a die is rolled 5 times, what is the probability that you see all of 1, 2 and 3?

Consider the conditions on m, n and t.

m, n, t∈ℤ : You can't roll a die 1.5 times, or see 2.3 outcomes.

n>0: The experiment must have at least 1 possible outcome.

t>0: There must be at least 1 trial.

m≥0: A negative number of specified outcomes makes no sense, but m=0 means we are placing no restrictions on the outcomes.

m≤n: Since all the specified outcomes must be distinct, the maximum m is the total number of possible outcomes.

P(m,n,t)=# of ways to get the specified outcome/total # of outcomes. Let's denote Q(m,n,t) as the numerator in this fraction—the number of ways that t independent trials of an experiment with n possible outcomes includes all of m specified and distinct outcomes. The denominator is easy to compute: Since every trial is independent, there are $n^t$ total possible outcomes.

Considering some base cases for Q(m,n,t):

$Q(0,n,t)=n^t$. This results in P(0,n,t)=1, as expected.

Q(m,n,m)=m!

Q(m,n,t)=0 if m>t.

Now considering two cases. A given trial either matches one of the specified outcomes, or it doesn't. If it matches (m possibilities), then there is one less outcome to match, and one fewer trial to do it. If it doesn't (n-m possibilities), then there are the same number of outcomes to match, and one fewer trial to do it. Therefore, a recursive formula for Q is:

$$Q(m,n,t)=m*Q(m-1,n,t-1)+(n-m)*Q(m,n,t-1)$$

Ignoring the case of m>t, for which the formula is unnecessary, if we keep recursing, we will always eventually get to either m'=0 or m'=t', one of the base cases. As is customary, primes in the statements above are meant to distinguish the variables from the original constants m and t). Applying the formula to the rolling dice example above yields:

$$Q(3,6,5) = 3*Q(2,6,4)+(6-3)*Q(3,6,4) =$$
$$3*(2*Q(1,6,3)+4*Q(2,6,3))+3*(3*Q(2,6,3)+3*Q(3,6,3)) =$$
$$3*(2*(Q(0,6,2)+5*Q(1,6,2))+$$
$$4*(2*Q(1,6,2)+4*Q(2,6,2)))+$$
$$3*(3*(2*Q(1,6,2)+4*Q(2,6,2))+3*3!) =$$
$$3*(2*(6^2+5*(Q(0,6,1)+5*Q(1,6,1)))+$$
$$4*(2*(Q(0,6,1)+5*Q(1,6,1))+4*2!))+$$
$$3*(3*(2*(Q(0,6,1)+5*Q(1,6,1))+4*2!)+18) =$$
$$3*(2*(36+5*(6+5*1))+4*(2*(6+5*1)+8))+$$

-continued
$$3*(3*(2*(6+5*1)+8)+18) = 3*(2*(91)+4*(30))+$$
$$3*(3*(30)+18) = 3*(302)+3*(108) = 1230$$

$$P(3,6,5) = Q(3,6,5)/6^5$$
$$= 1230/7776$$
$$= 0.158$$

Unfortunately, this formula is difficult to use in practice, because the recursive depth is significant, and the numbers involved quickly get very large. However, the formula can be approximated. First, the following can be recognized:

$$Q(m,n,t) \leq m*Q(m-1,n,t-1)+n*Q(m,n,t-1)$$

Using induction, it can be proved that the expansion of Q(m,n,t) via the recursion will generate $_tC_m$ (t choose m) terms. Each term will be of the form Q(0,n,t'), where t'<t, or of the form Q(m',n,m'), where m'<m. Each term Q(0,n,t') results from a recursion where m and t were reduced m times, and t was reduced a further t−m−t' times. The reductions of m and t together give a product of coefficients m*(m−1)*(m−2)* . . . *1=m!. The reductions of t alone give a product of t−m−t' coefficients n*n* . . . *n=$n^{t-m-t'}$. Finally, Q(0,n,t') itself is $n^{t'}$. So we have a term m!* $n^{t-m-t'}*n^{t'}$=m!*$n^{t-m}$.

Each term Q(m'n,m') results from a recursion where m and t were reduced m−m' times, and t was reduced a further t−m times. The reductions of m and t together give a product of coefficients m*(m−1)*(m−2)* . . . *(m'+1). The reductions of t alone give a product of t−m coefficients n*n* . . . *n=$n^{t-m}$. Finally, Q(m',n,m') itself is m'!. So we have a term m*(m−1)* . . . *(m'+1)*m'!*$n^{t-m}$=m!*$n^{t-m}$.

Putting the terms together, it can be found that:

$$Q(m,n,t) \leq {}_tC_m*m!*n^{t-m}$$
$$=t!/(t-m)!*n^{t-m}$$
$$\leq t^m*n^{t-m}$$

and thus $$P(m,n,t) \leq t^m*n^{t-m}/n^t$$
$$=(t/n)^m.$$

Importantly, the formula $(t/n)^m$ has been shown to overestimate P(m,n,t), so false positive rates are always this at worst. Considering the simplifications, they are reasonable approximations as long as both t and n are large compared to m. It can be seen that the disclosed implementations provide software watermarking that is highly robust and watermark detection that is very accurate.

DESCRIBE SPREADHSEET

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system implemented by a computer for enabling tracking of software, the system comprising:
one or more hardware processors configured by machine-readable instructions to:
receive marking input code corresponding to a computer program;
identify locations of the marking input code that can be modified in ways that preserve functionality of the computer program;
select at least one code transformation to apply to the marking input code, each of the at least one code transformation having a specific intrinsic constant;
derive derived constants from the specific intrinsic constants;
inject the at least one code transformation, including the corresponding derived constant into the marking input code;
save the results of the above steps on computer readable media as marked code; and
save a list of the derived constants on computer readable media in a file that is separate from the marked code, whereby the list of derived constants can be compared to constants in other computer program code to determine if the other computer program code was derived from the marked code.

2. The system of claim 1, wherein the functions of identify, apply, derive, and/or inject are part of an obfuscation process which renders the computer program more difficult to understand without adversely affecting the functionality of the code of the computer program.

3. The system of claim 1, wherein the function of identify includes identifying mathematical computations in the marking input code and the function of apply includes modifying the representation of data in the mathematical computations and modifying the operations of the mathematical computation.

4. The system of claim 3, wherein the derived constants are mathematical combinations of constants in the marked input code and the intrinsic constants.

5. The system of claim 1, wherein the derived constants are used as a watermark and the list of derived constants is used as an input to a detection algorithm to determine if other computer program code was derived from at least a portion of the marked code.

6. The system of claim 5, wherein the detection algorithm scans the other computer program code for a presence of a specified percentage of the derived constants, scans within a portion of the other computer program code for constants in a corresponding portion of the marked code, scans the other computer program code for derived constants identified as coming from the same function across all similarly sized chunks, scans the other computer program code for derived constants within a certain distance from an already found derived constant, scans the other computer program code for derived constants having a certain property, and/or scans the other computer program code for near matches to derived constants.

7. The system of claim 1, wherein the marked input code is one of source code, LLV bit-code, or binary code.

8. A method implemented by a computer for enabling tracking of software, the method comprising:
receiving marking input code corresponding to a computer program;
identifying locations of the marking input code that can be modified in ways that preserve functionality of the computer program; and
selecting at least one code transformation to apply to the marking input code, each of the at least one code transformation having a specific intrinsic constant;
deriving derived constants from the specific intrinsic constants;
injecting the at least one code transformation, including the corresponding derived constant, into the marking input code;
saving the results of the above steps on computer readable media as marked code; and
saving a list of the derived constants on computer readable media in a file that is separate from the marked code, whereby the list of derived constants can be compared to constants in other computer program code to determine if the other computer program code was derived from the marked code.

9. The method of claim 8, wherein the steps of identifying, applying, deriving, and/or injecting are part of an obfuscation process which renders the computer program more difficult to understand without adversely affecting the functionality of the code.

10. The method of claim 8, wherein the step of identifying includes identifying mathematical computations in the marking input code and the step of applying includes modifying the representation of data in the mathematical computations and modifying the operations of the mathematical computation.

11. The method of claim 10, wherein the derived constants are mathematical combinations of constants in the marked input code and the intrinsic constants.

12. The method of claim 8, wherein the derived constants are used as a watermark and the list of derived constants is used along with a detection algorithm to determine if other computer program code was derived from at least a portion of the marked code.

13. The method of claim 12, wherein the detection algorithm scans the other computer program code for a presence of a specified percentage of the derived constants, scans within a portion of the other computer program code for constants in a corresponding portion of the marked code, scans the other computer program code for derived constants identified as coming from the same function across all similarly sized chunks, scans the other computer program code for derived constants within a certain distance from an already found derived constant, scans the other computer program code for derived constants having a certain property, and/or scans the other computer program code for near matches to derived constants.

14. The method of claim 8, wherein the marked input code is one of source code, Ilv bit-code, or binary code.

15. A non-transient computer-readable storage medium having instructions embodied thereon, the instructions being executable by one or more processors to perform a method implemented by a computer for enabling tracking of software, the method comprising:
receiving marking input code corresponding to a computer program;
identifying locations of the marking input code that can be modified in ways that preserve functionality of the computer program; and
selecting at least one code transformation to apply to the marking input code, each of the at least one code transformation having a specific intrinsic constant;
deriving derived constants from the specific intrinsic constants;

injecting the at least one code transformation, including the corresponding derived constant, into the marking input code;

saving the results of the above steps on computer readable media as marked code; and saving a list of the derived constants on computer readable media in a file that is separate from the marked code, whereby the list of derived constants can be compared to constants in other computer program code to determine of the other computer program code was derived from the marked code.

16. The computer-readable storage medium of claim 15, wherein the steps of identifying, applying, deriving, and/or injecting are part of an obfuscation process which renders the computer program more difficult to understand without adversely affecting the functionality of the code.

17. The computer-readable storage medium of claim 15, wherein the step of identifying includes identifying mathematical computations in the marking input code and the step of applying includes modifying the representation of data in the mathematical computations and modifying the operations of the mathematical computation.

18. The computer-readable storage medium of claim 17, wherein the derived constants are mathematical combinations of constants in the marked input code and the intrinsic constants.

19. The computer-readable storage medium of claim 15, wherein the derived constants are used as a watermark and the list of derived constants is used along with a detection algorithm to determine if other computer program code was derived from at least a portion of the marked code.

20. The computer-readable storage medium of claim 19, wherein the detection algorithm scans the other computer program code for a presence of a specified percentage of the derived constants, scans within a portion of the other computer program code for constants in a corresponding portion of the marked code, scans the other computer program code for derived constants identified as coming from the same function across all similarly sized chunks, scans the other computer program code for derived constants within a certain distance from an already found derived constant, scans the other computer program code for derived constants having a certain property, and/or scans the other computer program code for near matches to derived constants.

21. A system implemented by a computer for detecting a watermark in software, the system comprising:

one or more hardware processors configured by machine-readable instructions to:

receive marked code corresponding to at least a portion of a computer program, wherein the marked code is created by;

identifying locations of the marking input code that can be modified in ways that preserve functionality of the computer program;

select at least one code transformation to apply to the marking input code, each of the at least one code transformation having a specific intrinsic constant;

derive derived constants from the specific intrinsic constants; and injecting the at least one code transformation, including the derived constant, into the marked code; and scan the marked code and compare the marked to code to a list of the at least one derived constant to look for specified patterns associated with the watermark data.

22. The system of claim 21, wherein list of the at least one derived constants is stored on computer readable media in a file that is separate from the marked code, and wherein the scan is based on the metadata.

* * * * *